United States Patent [19]

Kawakami et al.

[11] Patent Number: 5,548,019
[45] Date of Patent: Aug. 20, 1996

[54] COMPOSITION FOR AN AQUEOUS COATING MATERIAL

[75] Inventors: Shoichi Kawakami, Chiba; Toru Okamoto, Nagareyama; Nobuyuki Miyazaki; Bunji Uchino, both of Kawasaki; Kazuyoshi Nomura, Kazo; Hiroyuki Kato, Konosu, all of Japan

[73] Assignees: Asahi Glass Company Ltd; Asahi Glass Coat & Resin Co., Ltd.; Asia Industry Co., Ltd., all of Tokyo, Japan

[21] Appl. No.: 368,654

[22] Filed: Jan. 4, 1995

[30] Foreign Application Priority Data

Jan. 7, 1994 [JP] Japan .................................. 6-000543

[51] Int. Cl.$^6$ .................. C08J 3/00; C08K 3/20; C08L 75/00; C08F 8/00
[52] U.S. Cl. ............. 524/591; 524/589; 524/839; 525/123; 525/129; 525/124; 525/455; 528/70
[58] Field of Search ................ 528/70; 524/839, 524/591, 589; 525/123, 129, 124, 455

[56] References Cited

U.S. PATENT DOCUMENTS

| | | | |
|---|---|---|---|
| 4,556,048 | 12/1985 | Maki et al. | 126/417 |
| 5,387,642 | 2/1995 | Blum et al. | 524/839 |
| 5,441,771 | 8/1995 | Seltmann et al. | 528/70 |

*Primary Examiner*—Paul R. Michl
*Assistant Examiner*—Patrick Niland
*Attorney, Agent, or Firm*—Olbon, Spivak, McClelland, Maier, & Neustadt, P.C.

[57] ABSTRACT

An aqueous coating composition comprising a polyisocyanate compound and a fluorine-containing copolymer having hydroxyl groups, wherein the fluorine-containing copolymer having hydroxyl groups is a copolymer comprising 20–80 mol % of polymer units derived from a fluoroolefin and 0.1–25 mol % of polymer units derived from a monomer having a hydrophilic site, said polyisocyante compound and said fluorine-containing copolymer both being dispersed in water.

17 Claims, No Drawings

COMPOSITION FOR AN AQUEOUS COATING MATERIAL

BACKGROUND OF THE INVENTION

1. Field of the Invention

The present invention relates to an aqueous coating composition.

2. Discussion of Background

Heretofore, it has been known that copolymers made of a fluoroolefin, a cyclohexyl vinyl ether and various other monomers, are soluble in organic solvents at room temperature, and when used as coating materials, they provide transparent coating layers having high gloss and excellent properties of fluorinated resins, such as high weather resistance, water and oil repellency, stain resistance and non-adhesiveness (e.g. Japanese Unexamined Patent Publication No. 44083/1980). Their use is increasing in the field of e.g. building construction.

However, such copolymers are hardly applicable to a coated substrate having a low solvent-resistance which is apt to be corroded by the above organic solvents. For example, when the coating material is applied to an old aged, deteriorated coating layer for repairment, the deteriorated coating layer may sometimes happen to peel off partly.

On the other hand, in recent years, there have been restrictions against use of organic solvents from the viewpoint of air pollution. Further, organic solvents volatilized during the coating step at factories or sites for coating may substantially adversely affect human bodies. Particularly, solvents such as esters or ketones tend to cause, for example, paralysis or swelling in respiratory organs or nerves, and further sometimes cause symptom of poisoning. Under these circumstances, the demand is increasing for aqueous coating materials or powder coating materials which employ no organic solvents. Such studies have been made also with respect to fluorine resins, and it has been reported that fluorine resins having no functional groups can be prepared by emulsion polymerization (Japanese Unexamined Patent Publication No. 25411/1980).

Further, fluorine-containing copolymers having functional groups such as hydroxyl groups obtained by emulsion polymerization have been disclosed in Japanese Unexamined Patent Publications No. 34107/1982 and No. 31044/1986. Furthermore, aqueous dispersions of fluorine-containing copolymers having the mechanical stability and chemical stability improved, have been proposed in, for example, Japanese Unexamined Patent Publication No. 207352/1988.

PROBLEMS TO BE SOLVED BY THE INVENTION

With respect to the conventional coating materials employing aqueous dispersions of fluorine-containing copolymers, when a coating layer is formed at an ordinary temperature, it is necessary to use a fluorine-containing copolymer having a low glass transition temperature, and when a coating layer is formed at an ordinary temperature using a fluorine-containing copolymer having a high glass transition temperature, it is necessary to use a large amount of a coalescing agent. In the former case, the coating layer tends to be soft, whereby there will be a problem that staining substances tend to penetrate into the coating layer and the stain is hardly removed. Further, in the latter case, the coalescing agent tends to remain in the coating layer, whereby there will be a problem that the film is likely to be stained.

Further, when heat drying is conducted during the coating in factories, if the hardness of a coating layer is inadequate, when the coated products are piled up after drying, the coating film shows, for example, the reduction of gloss and the formation of scratches, resulting in unevenness of appearance. As the conditions for piling up, it is required to shorten the cooling time after heat drying and to increase the load in view of, for example, coating efficiency. Accordingly, to increase the manufacturing efficiency at coating factories, the coating layer is required to have an antiblocking property.

The present invention is to solve the above problems of the prior art. Namely, the present invention is to provide an aqueous coating composition which is capable of providing a coating layer which is excellent in, for example, the water resistance and anti-blocking property and which, when a coating layer is formed at an ordinary temperature, has an excellent film-forming property and stain resistance.

MEANS FOR SOLVING THE PROBLEMS

The present invention provides an aqueous coating composition comprising a polyisocyanate compound and a fluorine-containing copolymer having hydroxyl groups, being dispersed in water.

As the fluorine-containing copolymer having hydroxyl groups of the present invention, preferred is a copolymer of a fluoroolefin with a hydrocarbon type monomer by virtue of the excellent weather resistance, pigment dispersibility and coating layer properties. The hydroxyl groups can readily be introduced by copolymerizing with a monomer having a hydroxyl group. Further, the fluorine-containing copolymer of the present invention is preferably a copolymer obtained by emulsion polymerization since its stabilities (mechanical stability and chemical stability) are excellent and a uniform dispersion can thereby be obtained. A copolymer obtained by conducting emulsion polymerization in the presence of a monomer having a hydrophilic site is preferred since the stability is further excellent.

Here, the fluoroolefin is preferably a fluoroolefin having from 2 to 4 carbon atoms such as vinylidene fluoride, trifluoroethylene, chlorotrifluoroethylene, tetrafluoroethylene, pentafluoropropylene or hexafluoropropylene. Particularly preferred is a per haloolefin.

Further, it is preferred that the fluorine-containing copolymer obtained by emulsion polymerization has polymer units derived from a monomer having a hydrophilic site. Such units are contained as an essential component of the fluorine-containing copolymer, whereby the mechanical and chemical stabilities of the aqueous dispersion can be improved, and further, the film-forming properties and the water resistance of the coating layer can also be improved. The hydrophilic site in the monomer having the hydrophilic site in the present invention may be ionic, nonionic or amphoteric, or a combination thereof.

Such a monomer having a hydrophilic site is preferably a macromonomer, since the stability is further improved. The macromonomer is meant for a low molecular weight polymer or oligomer having a radical polymerizable unsaturated group at one terminal. Namely, it is a compound having a radical polymerizable unsaturated group at one terminal and at least two repeating units having a hydrophilic site. It is usually preferred to employ a compound having at least 100 repeating units in view of the polymerizability, water resistance, etc., although it may depend on the type of the repeating units.

The macromonomer having a hydrophilic site includes, for example, polyethers or polyesters having radical polymerizable unsaturated groups at their one terminal, for example, as follows:

(1) $CH_2=CHO(CH_2)_p(OCH_2CH_2)_q(OCH_2CH(CH_3))_rOX$, wherein p is an integer of from 1 to 10, q is an integer of from 2 to 20, r is an integer of from 0 to 20, X is a hydrogen atom, a lower alkyl group or an acyl group, and the oxyethylene units and the oxypropylene units may be arranged in either a block form or a random form.

(2) $CH_2=CHCH_2O(CH_2)_p(OCH_2CH_2)_q(OCH_2CH(CH_3))_rOX$, wherein p, q, r and X are as defined above with respect to the formula (1), and the oxyethylene units and the oxypropylene units may be arranged in either a block form or a random form.

(3) $CH_2=CHO(CH_2)_sO(CO(CH_2)_tO)_uX$, wherein s is an integer of from 1 to 10, t is an integer of from 1 to 10, u is an integer of from 1 to 30 and X is H, a lower alkyl group or an acyl group.

Among them, the one having a structure of a vinyl ether type at one terminal is preferred, since it is excellent in the copolymerizability with the fluoroolefin. Those wherein the polyether chain portion is composed of oxyethylene units or a combination of oxyethylene units and oxypropylene units, are particularly preferred, since they are excellent, for example, in the hydrophilic properties.

Further, at least two oxyethylene units should preferably be present in the monomer having a hydrophilic site to accomplish various properties including the stability. If the total number of oxyalkylene units such as oxyethylene units or oxypropylene units is too large, the water resistance or weather resistance of the coating layer tends to be poor, such being undesirable.

such a monomer having a hydrophilic site can be prepared by a method wherein a vinyl ether or allyl ether having a hydroxyl group is subjected to the ring-opening polymerization of an alkyleneoxide or a compound having a lactone ring, or to the reaction with a diol.

Further, the monomer-having a hydrophilic site may be a macromonomer having hydrophilic chains formed by the radical polymerization of an ethylenically unsaturated monomer and having a radical polymerizable unsaturated group such as a vinyl ether or allyl ether at its terminal.

Such a macromonomer can be prepared by the method disclosed by Yamashita et al in Polym. Bull., 5, 335 (1981). Namely, an ethylenically unsaturated monomer having a hydrophilic group is radical-polymerized in the presence of a chain transfer agent and an initiator having a functional group capable of condensation, to produce a polymer having functional groups capable of condensation, and then a compound such as glycidyl vinyl ether or glycidyl allyl ether is reacted to the functional groups of this polymer to introduce radical polymerizable unsaturated groups to the terminals.

The ethylenically unsaturated monomer used for the preparation of this macromonomer, includes acrylamide, methacrylamide, N-methylol acrylamide, N-methylolmethacrylamide, 2-methoxyethyl acrylate, 2-methoxyethyl methacrylate, diacetone acrylamide, hydroxyethyl acrylate, hydroxypropyl acrylate, hydroxybutyl acrylate, hydroxyethyl methacrylate, hydroxypropyl methacrylate, hydroxybutyl methacrylate, an acrylic acid ester of a polyhydric alcohol, a methacrylic acid ester of a polyhydric alcohol, and vinyl pyrrolidone.

In addition, as a copolymerizable monomer, acrylamide and its derivatives, methacrylamide and its derivatives, N-methylol acrylamide derivatives, ethyl acrylate carbitol, an acrylic acid ester of triethylene glycol monomethyl ether, 2-hydroxyethylacryloyl phosphate, and butoxyethyl acrylate, may be mentioned.

The initiator useful for the preparation of this macromonomer, includes 4,4'-azobis-4-cyanovalerianic acid, 2,2'-azobis-2-amidinopropane hydrochloride, potassium peroxide, ammonium peroxide, azobisisobutylonitrile and benzoyl peroxide.

The polymer units derived from a hydroxyl group-containing monomer, may be formed by copolymerizing a hydroxyl group-containing monomer or by a polymer reaction of a polymer to form the units containing a hydroxyl group. Here, the hydroxyl group-containing monomer may be a hydroxyalkyl vinyl ether such as hydroxybutyl vinyl ether, a hydroxyalkyl allyl ether such as hydroxyethyl allyl ether, a hydroxyalkyl ester of acrylic acid or methacrylic acid, such as hydroxyethyl acrylate or hydroxyethyl methacrylate, a vinyl ester of hydroxycarboxylic acid or an allyl ester of hydroxycarboxylic acid.

Further, as the method of forming units containing a hydroxyl group by the polymer reaction of a polymer, a method may be mentioned wherein a vinyl ester hydrolyzable, is copolymerized, followed by hydrolysis to form hydroxyl groups.

The fluorine-containing copolymer in the present invention, may contain, in addition to the above described units, units derived from a monomer copolymerizable therewith. Such a monomer may be a vinyl compound including an olefin such as ethylene or propylene, a vinyl ether such as ethyl vinyl ether, propyl vinyl ether, butyl vinyl ether or cyclohexyl vinyl ether, a vinyl ester such as butyl vinyl ester or octyl vinyl ester, and an aromatic vinyl compound such as styrene or vinyl toluene, an allyl compound such as ethyl allyl ether, an acryloyl compound such as butyl acrylate, a methacryloyl compound such as ethyl methacrylate, an isopropenyl ether, or an unsaturated fatty acid. Particularly preferred are an olefin, a vinyl ether, a vinyl ester, an allyl ether and an allyl ester.

Here, the olefin is preferably the one having from 2 to 10 carbon atoms, and the vinyl ether, vinyl ester, allyl ether and allyl ester are preferably those having a linear, branched or alicyclic alkyl group having from 2 to 15 carbon atoms.

In such a monomer, hydrogen atoms bonded to carbon atoms may be at least partially substituted by fluorine atoms.

The fluorine-containing copolymer in the present invention preferably comprises from 20 to 80 mol % of polymer units derived from a fluoroolefin and from 0.1 to 25 mol % of polymer units derived from a monomer having a hydrophilic site.

If the amount of the polymer units derived from a fluoroolefin is too small, no adequate weather resistance can be obtained. On the other hand, if the amount is too large, the dispersibility in water becomes poor, such being undesirable. The units derived from a fluoroolefin are preferably from 30 to 70 mol %.

On the other hand, if the amount of the polymer units derived from a monomer having a hydrophilic site is too small, the dispersibility in water will be poor, and if the amount is too large, the weather resistance and water resistance of the coating layer will be poor, such being undesirable. The content of the polymer units derived from the monomer having a hydrophilic site is preferably from 0.3 to 20 mol %.

Further, the content of the polymer units containing a hydroxyl group is from 0.1 to 25 mol %, preferably from 1 to 15 mol %. If the content of such units is too large, the dispersibility in water will be poor, and it is likely that the coating layer after curing will be hard and brittle, or the water resistance will be low due to an influence of the remaining hydroxyl groups, such being undesirable.

Further, such units will be counted for both of the polymer units derived from a monomer containing a hydrophilic site and the polymer units containing a hydroxyl group, when the polymer units derived from the monomer having a hydrophilic site contain those having hydroxyl groups. The content of units other than the polymer units derived from the above fluoroolefin and the polymer units derived from the monomer having a hydrophilic site, is preferably from 0 to 70 mol %. If such units are too much, the weather resistance tends to be poor, such being undesirable.

At the time of preparing the fluorine-containing copolymer of the present invention, the emulsion polymerization is preferably conducted in the presence of a nonionic emulsifier having HLB of from 12 to 18 and an anionic emulsifier. If HLB of the nonionic emulsifier is out of this range, the stability during the emulsion polymerization tends to be low, or the stability of the dispersion obtained tends to be low. Particularly preferred HLB is from 14 to 16. When the anionic emulsifier is used alone, although the stability during the emulsion polymerization is high, the dispersion obtained tends to agglomerate when an inorganic substance is added thereto, and when formed into a coating layer, the water resistance tends to be low due to the high hydrophilicity.

On the other hand, when the nonionic emulsifier is used alone, a slight amount of a viscous substance is likely to form during the emulsion polymerization, and when the aqueous dispersion is stored for a long period of time or stored at a high temperature, the viscous substance may trigger the increase of the viscosity and, in some cases, cause solidification.

When the emulsion polymerization is conducted in the presence of the nonionic emulsifier having HLB of from 12 to 18 and the anionic emulsifier, a fluorine-containing aqueous dispersion having a high stability at the time of incorporating it into a coating material and a high stability at the time of storage, and further being capable of providing a coating layer excellent in the weather resistance and water resistance, can be obtained.

Further, as the lipophilic group of the nonionic emulsifier, the one having no polyfluoroalkyl group is preferred from the viewpoint of the formation of a dense coating layer. As the nonionic emulsifier, an alkylphenol ethylene oxide adduct, a higher alcohol ethylene oxide adduct, a block copolymer of ethylene oxide with propylene oxide may, for example, be mentioned. The amount of the emulsifier used, may be appropriately varied depending on the condition, and is usually preferably from 0.1 to 5 parts by weight per 100 parts by weight of the monomer to be emulsion polymerized.

Likewise, the lipophilic group of the anionic emulsifier is preferably the one having no polyfluoroalkyl group. As the anionic emulsifier, an alkylbenzene sulfonate, an alkylnaphthalene sulfonate, a higher fatty acid ester, an alkylsulfonic acid ester, a sulfonic acid ester of polyoxyethylene monoalkyl ether, or a phosphoric acid ester may, for example, be mentioned.

The initiation of the emulsion polymerization may be conducted by an addition of a polymerization initiator as in the case of the initiation of usual emulsion polymerization. Such a polymerization initiator may be a usual radical initiator. However, a water-soluble initiator is preferably employed. Specifically, the initiator may, for example, be an inorganic initiator, for example, a persulfate such as ammonium persulfate, hydrogen persulfate or a redox initiator composed of a combination of such a persulfate or hydrogen peroxide with a reducing agent such as sodium hydrogen sulfite or sodium thiosulfate, or such an inorganic initiator combined with a small amount of iron, a ferrous salt or silver sulfate, or an organic initiator, for example, a dibasic acid peroxide such as disuccinic acid peroxide or diglutaric acid peroxide, azobisisobutylamidine hydrochloride, or azobisisobutylonitrile.

The amount of the polymerization initiator may be selected suitably depending upon the type and the emulsion polymerization conditions. However, it is usually within a range of from 0.005 to 0.5 part by weight, per 100 parts by weight of the monomer for emulsion polymerization. Further, such polymerization initiator may be added all at once, but may be added portionwise, as the case requires.

For the purpose of increasing the pH of the emulsion, a pH controlling agent may be employed. Such pH controlling agent includes inorganic bases such as sodium carbonate, potassium carbonate, sodium hydrogen orthophosphate, sodium thiosulfate and sodium tetraborate, and organic bases such as triethyl amine, triethanol amine, dimethylethanol amine and diethylethanol amine.

The pH controlling agent is added usually in an amount of from 0.05 to 2 parts by weight, preferably from 0.1 to 2 parts by weight, per 100 parts by weight of the medium for the emulsion polymerization. The polymerization speed is likely to be high as the pH increase.

The temperature for the initiation of emulsion polymerization is selected at the optimum level depending appropriately on the type of the polymerization initiator. It is usually within a range of from 0° to 100° C., preferably from 10° to 90 ° C. The reaction pressure may be suitably selected and is usually from 1 to 100 kg/cm$^2$, particularly preferably from 2 to 50 kg/cm$^2$.

In such a process, the materials such as the monomers, water, the emulsifier and the initiator, may be charged all at once for polymerization. However, for the purpose of improving various physical properties such as the stability of the dispersion and the gloss of the coating layer by minimizing the particle size of the dispersed particles, the starting materials may be emulsified prior to the addition of the polymerization initiator by means of an agitation machine such as a homogenizer, and then the initiator is added for polymerization. Further, the monomers may be added portionwise or continuously. In such a case, the monomer composition may be varied.

The fluorine-containing copolymer to be used in the present invention may be the conventional dispersions proposed in, for example, Japanese Unexamined Patent Publications Nos. 261367/1986, No. 231044/1986, No. 43603/1987, No. 314202/1988, No. 147601/1990, No. 33148/1991, NO. 181540/1991, NO. 199179/1991, No. 33941/1992 and No. 33942/1992.

The aqueous coating composition of the present invention comprises, in addition to the above fluorine-containing copolymer, a polyisocyanate compound. Such a polyisocyanate compound is a polyisocyanate compound to be mechanically dispersed in water or is a self-emulsifiable polyisocyanate compound. The self-emulsifiable polyisocyanate compound is a compound emulsifiable and dispersible in water without an emulsifier.

The polyisocyanate compound to be mechanically dispersed in water may, for example, be an aliphatic polyisocyanate such as hexamethylene diisocyanate, an aromatic polyisocyanate such as m- or p-phenylene diisocyanate, 2,4- or 2,6-tolylene diisocyanate, diphenylmethane-4,4'-diisocyanate, naphthalene-1,5-diisocyanate or 4,4'-diisocyanate-3,3'-dimethyldiphenyl, an alicyclic polyisocyanate such as bis(isocyanatecyclohexyl)methane or isophorone diisocyanate, a crude polyisocyanate such as crude tolylene diisocyanate or crude diphenylmethane diisocyanate, a modified polyisocyanate such as carbodiimide-modified diphenylmethane diisocyanate, polyol-modified diphenylmethane diisocyanate or polyol-modified hexamethylene diisocyanate.

The polyisocyanate may be a dimer or trimer in the form of buret type, isocyanurate ring type or urethodione type, or a blocked polyisocyanate obtained by reacting an isocyanate group with a blocking agent. As the blocking agent, an alcohol, a phenol, a caprolactum, an oxime and an active methylene compound, may, for example, be mentioned. The above polyisocyanate may be used in combination as a mixture of two or more of them.

The polyisocyanate is mechanically dispersed in water for use. During the dispersion, an emulsifier may be added to obtain a stable dispersion. As the polyisocyanate to be mechanically dispersed in water, those having a relatively low viscosity are preferred. As the emulsifier to be used, conventional emulsifiers may be used without particular restriction. However, ionic emulsifiers, particularly those having an active hydrogen atom, are undesirable, since when they are dispersed, they tend to react and increase the viscosity or decrease the dispersibility. Nonionic emulsifiers, particularly those having polyoxyethylene chains are preferred.

A blocked polyisocyanate usually cures at a temperature of at least 140° C. Thus, if the curing is conducted at a temperature less than that, it is preferred to use a non-blocked polyisocyanate.

Further, as the self-emulsifiable polyisocyanate compound, a prepolymer obtained by reacting the above-mentioned polyisocyanate with a hydrophilic polyoxyalkylene, may, for example, be mentioned. As the hydrophilic polyoxyalkylene used for the reaction, the one having at least one isocyanate-reactive group and a molecular weight within a range of from 200 to 4,000, may preferably be used. Particularly preferred is a polyoxyalkylene polyol or a polyoxyalkylene monol having a molecular weight within a range of from 300 to 1,500. Those having a small molecular weight do not show adequate self-emulsifiable property. Those having a large molecular weight show excellent self-emulsifiable property, but the dispersibility in water tends to be poor and the crystallinity tends to be high, whereby the storage stability at a low temperature will be lowered and they will be turbid. The oxyalkylene chains of the polyoxyalkylene are preferably entirely or mostly composed of oxyalkylene groups in view of the hydrophilicity.

The reaction of the polyisocyanate with the polyoxyalkylene glycol may be conducted in the presence of a catalyst such as a tertiary amine, an alkyl-substituted ethyleneimine, a tertiary alkylphosphine, a metal alkylacetonate or a metal salt of an organic acid, and, if the case requires, in the presence of a cocatalyst, at a temperature of not more than 100° C. Further, in this reaction, it is preferred to adjust so that the amount of the remaining isocyanate groups is from 10 to 24% by weight.

If the amount of the remaining isocyanate groups is small, the reactivity thereof with the fluorine-containing copolymer may sometimes be low, such being undesirable. Further, to obtain an adequate crosslinking degree, a large amount of an isocyanate compound is required, whereby adverse effects to the weather resistance of the coating layer may sometimes be caused, such being undesirable. If the amount of the remaining isocyanate groups is too large, a stable emulsion is hardly formed, such being undesirable. Such a self-emulsifiable isocyanate compound is described in Japanese Examined Patent Publication No. 15270/1992.

Further, the aqueous coating composition of the present invention can be prepared by blending the fluorine-containing copolymer with the polyisocyanate compound. As the method of blending, the following methods may be mentioned. Namely, a method wherein the polyisocyanate compound is added to the aqueous dispersion of the fluorine-containing copolymer, followed by stirring, or a method wherein the polyisocyanate compound is mechanically dispersed in water and then blended with the aqueous dispersion of the fluorine-containing copolymer, may be mentioned. In either method, the polyisocyanate compound may preferably be dissolved in an appropriate organic solvent (such as methyl ethyl ketone or butyl carbitol acetate) and then blended with the aqueous dispersion of the fluorine-containing copolymer or dispersed in water, since the dispersion can readily be made and the particle size of the polyisocyanate compound can be made small. The amount of the organic solvent is from 1 to 20% by weight, preferably from 1 to 10% by weight relative to the polyisocyanate compound.

Further, the proportion of the fluorine-containing copolymer and polyisocyanate compound to be blended, is not particularly restricted, but preferably within a range of from 0.1 to 2.0 in terms of a NCO/OH ratio (molar ratio). If the NCO/OH ratio (molar ratio) is too large, isocyanate groups tend to remain in the coating layer or react with the water content to form bubbles, whereby defects of the coating layer may sometimes be caused, such being undesirable. Further, if the NCO/OH ratio (molar ratio) is too small, adequate effects of the crosslinking can not be obtained, such being undesirable. Particularly, the NCO/OH ratio (molar ratio) is preferably within a range of from 0.5 to 1.5.

The aqueous coating composition of the present invention may be used by itself as an aqueous coating material. If necessary, additives usually added to aqueous coating materials such as a coloring agent, a coalescing agent, a plasticizer, an ultraviolet absorber, a levelling agent, a wetting agent, an anti-skinning agent or a pigment-dispersing agent, may be incorporated.

The coloring agent includes a dye, an organic pigment and an inorganic pigment. To obtain excellent weather resistance of the coating layer, it is preferred to use the inorganic pigment. Further, a metallic pigment such as aluminum paste may be used.

As the coalescing agent, a polyhydric alcohol monoether such as dipropylene glycol-n-butyl ether, tripropylene glycol-n-butyl ether, ethylene glycol monoethyl ether, ethylene glycol monobutyl ether, diethylene glycol monoethyl ether or diethylene glycol monobutyl ether, or an organic acid ester of them, and 3-ethoxy ethylpropionate, may, for example, be mentioned. The amount of the fluorine-containing copolymer is from 1 to 30% by weight, preferably from 1 to 15% by weight relative to the fluorine-containing copolymer.

The plasticizer may be of a conventional type, for example, a low molecular weight plasticizer such as dioctyl phthalate, or a high molecular weight plasticizer such as a vinyl polymer plasticizer or a polyester plasticizer.

The above aqueous coating composition or a coating material having additives incorporated into the composition, is suitable to coating of newly produced articles for building, molded articles or founded articles. This is also suitable to coating of the articles for building, molded articles or founded articles, to which a coating material is already applied. The coating is conducted at an ordinary temperature, from 30° to 150° C. or from 150° to 280° C., depending on the uses. Forced drying at a high temperature may be conducted. The composition of the present invention has excellent film-forming property at an ordinary temperature, from 5° to 100° C. or from 5° to 130° C.

The materials of the articles to be coated may, for example, be inorganic materials such as concrete, natural stones or glass, metals such as iron, stainless steel, aluminum, copper, brass or titanium, or wood. Further, the coating material of the present invention is suitable to coating of organic substrates, namely, already formed coating layers, plastics, rubber or adhesives. This is further suitable to coating of composite materials of organic and inorganic materials such as fiber-reinforced plastics, resin-reinforced concrete or fiber-reinforced concrete.

Further, the articles to be coated may, for example, be transportation equipment such as automobiles, electric cars or aircrafts, construction members such as bridge members or steel towers, industrial materials such as waterproof sheets, tanks or pipes, building members such as exterior of buildings, doors, members for windows or gates, monuments or poles, road members such as median strips of road or guardrails, communication equipment, and electric and electronic parts.

Prior to the coating of the composition of the present invention or the coating material having additives incorporated into the composition on the articles to be coated, it is preferred to conduct pretreatments usually conducted prior to the coating of aqueous coating materials, for example, grinding of the surface, sanding treatment, sealing treatment, primer treatment or coating of an undercoater. The sealing agent, primer and undercoater are preferably in the form of an aqueous solution or aqueous dispersion, but may be in the form of an organic solvent solution or a non-aqueous dispersion. However, in view of the safety of the entire system, it is preferred to use an aqueous solution or aqueous dispersion. Further, as the primer or undercoater, the ones of epoxy type is preferred, since excellent adhesive property can be obtained.

The composition of the present invention has excellent safety and is capable of providing coating layers having excellent weather resistance and anti-blocking property.

EXAMPLES

Now, the present invention will be described in further detail with reference to Preparation Examples and Examples. However, it should be understood that the present invention is by no means restricted by such specific Examples. In the following Examples, "parts" means "parts by weight" unless otherwise specified.

Preparation Example 1

(Preparation of Aqueous dispersion 1 of a fluorine-containing copolymer)

Into a stainless steel autoclave equipped with a stirrer, 18.1 parts of ethyl vinyl ether (EVE), 18.5 parts of cyclohexyl vinyl ether (CHVE), 1.9 parts of hydroxybutyl vinyl ether (HBVE), 2.1 parts of a monomer having a hydrophilic site (EOVE), 100 parts of deionized water, 2 parts of an emulsifier (manufactured by Nihon Nyukazai: N-1110), 0.1 part of an emulsifier (manufactured by Nikko Chemical: SLS), 0.2 part of potassium carbonate ($K_2CO_3$) and 0.07 part of ammonium persulfate (APS) were charged, and the mixture was cooled with ice. Then, nitrogen gas was introduced under a pressure of 3.5 kg/cm² for deaeration. This operation was repeated twice, and then dissolved air was removed by evacuation to a pressure of 10 mmHg. Then, 59.4 parts of chlorotrifluoroethylene (CTFE) was charged, and the reaction was conducted at 30° C. for 12 hours to obtain a milky white aqueous dispersion of a fluorine-containing copolymer. This is referred to as Aqueous dispersion 1. EOVE is a compound represented by $CH_2=CHOCH_2CH_2CH_2CH_2O$ $(CH_2CH_2O)_nH$ and the number average molecular weight is about 500.

Preparation Example 2

(Preparation of Aqueous dispersion 2 of a fluorine-containing copolymer)

Into a stainless steel autoclave equipped with a stirrer, 42.6 parts of 6,6-dimethylheptanic acid vinyl, 3.2 parts of HBVE, 1.1 parts of crotonic acid, 85.1 parts of deionized water, 2.1 parts of an emulsifier (manufactured by Nihon Nyukazai: N-1110), 2.1 parts of an emulsifier (manufactured by Nikko Chemical: SLS) and 1.1 parts of $Na_2B_4O_7$ (pH adjuster) were charged, and the mixture was cooled with ice. Then, nitrogen gas was introduced under a pressure of 3.5 kg/cm² for deaeration. This operation was repeated twice, and then dissolved air was removed by evacuation to a pressure of 10 mmHg. Then, 53.2 parts of CTFE was charged, and further ethylene was introduced under a pressure of 15 kg/cm². The internal temperature was raised to 80° C. 20 Parts of a 3% aqueous solution of potassium persulfate was added over 2 hours while keeping the pressure in the system at 30 kg/cm², and then stirring was continued for 12 hours while supplementing ethylene so that the pressure in the system would be 30 kg/cm² to obtain a milky white aqueous dispersion of a fluorine-containing copolymer. This is referred to as Aqueous dispersion 2.

Examples 1 to 4 and Comparative Example 1 to 3

Aqueous coating compositions were prepared according to the compositions as indicated in the upper portion of Table 1. The incorporation was made by dispersing a polyisocyanate compound in water (butylcarbitol acetate (BCA) was blended with a polyisocyanate compound, and then the mixture was dispersed in water), and then the dispersion was incorporated into an aqueous dispersion of a fluorine-containing copolymer under stirring, and other additives were added thereto.

A primer coating material of an acryl type emulsion was coated on a slate plate to prepare a test sample. Each aqueous coating composition was applied to the test sample by spray coating, and dried at 90° C. for 40 minutes, and then subjected to the following tests. The results are shown in the lower portion of Table 1.

In Example 5, the same operation as in Example 1 was conducted except for "dried at 90° C. for 40 minutes" being changed to "dried at 20° C. for 1 week". Further, in Comparative Example 3, the composition underwent during foaming the preparation and then gelation, whereby the evaluations of the solvent resistance test, weather resistance test and anti-blocking test were impossible to conduct.
Solvent resistance test:

The coating layer was rubbed with gauze having xylene penetrated therein 50 times, and the condition of the coating layer was observed. o represents no change, Δ, deterioration of gloss and ×, dissolution of the coating layer.

Weather resistance test:

The aqueous coating composition was coated on a slate plate and dried at room temperature for 24 hours. The test piece thus obtained was subjected to accelerated weather resistance test for 5,000 hours by means of a Sunshine Weather-Ometer. Those showing the gloss-maintaining ratio after the test of at least 80% are indicated as o, and those of less than 80% are indicated as x.

Anti-blocking test:

Two test pieces subjected spray coating and drying as above were put together having their coated layer surfaces faced each other, and then a load of 0.5 kg/cm$^2$ was applied thereto. After leaving it to stand at 50° C. for 1 hour, the test pieces were separated and the conditions of the coated layers were observed. o represents no change and x represents distinct damages of the coating layer.

In Table 1, the polyisocyanate compounds 1 and 2 (hereinafter, referred to simply as Compounds 1 and 2) are self-emulsifiable polyisocyanates derived from hexamethylene diisocyanate, namely, DC-3901 manufactured by Nihon Polyurethane K.K. (NCO content is 12% by weight) and DC-3900 manufactured by Nihon Polyurethane K.K. (NCO content is 17% by weight). Further, the polyisocyanate compound 3 (hereinafter, referred to simply as Compound 3) is Colonate HX manufactured by Nihon Polyurethane K.K. (NCO content is 21% by weight) and has no self-emulsifiable property.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Dispersion 1 | 100 | | | | 100 | 100 | | 100 |
| Dispersion 2 | | 100 | 100 | 100 | | | 100 | |
| Compound 1 | 3.7 | 8.1 | | 4.0 | 3.7 | | | |
| Compound 2 | | | 5.7 | | | | | |
| Compound 3 | | | | | | | | 4.0 |
| Water | 3.7 | 8.1 | 5.7 | 4.0 | 3.7 | | | |
| BCA | 0.8 | 1.5 | 1.1 | 0.8 | 0.8 | 0.5 | 0.5 | 0.5 |
| Solvent resistance test | O | O | O | Δ | O | X | X | — |
| Weather resistance test | O | O | O | O | O | O | O | — |
| Anti-blocking test | O | O | O | Δ | O | X | X | — |

What is claimed is:

1. An aqueous coating composition comprising a polyisocyanate compound and a fluorine-containing copolymer having hydroxyl groups is a compolymer comprising 20–80 mol % of polymer units derived from a fluoroolefin and 0.1–25 mol % of polymer units derived from a monomer having a hydrophilic site, said polyisocyante compound and said fluorine-containing copolymer both being dispersed in water.

2. The aqueous coating composition according to claim 1, wherein fluorine-containing copolymer having hydroxyl groups comprised 1–15 mol % of polymer units containing hydroxyl groups.

3. The aqueous coating composition according to claim 1, wherein said hydrophilic site comprises polyether or polyester groups.

4. The aqueous coating composition according to claim 1, wherein the polyisocyanate compound is a self-emulsifiable compound.

5. An aqueous coating compound comprising A) an aqueous solution or dispersion of a fluorine-containing copolymer having hydroxyl groups and B) an polyisocyanate component which is present as an emulsion in A), wherein the NCO/OH equivalent ratio, based on the isocyanate groups of component B) and the hydroxyl groups of the fluorine-containing copolymer present in A) is from 0.1 to 2.0.

6. The aqueous coating composition of claim 5, wherein said fluorine-containing copolymer comprises the emulsion polymerization product of a) 20–80 mol % of polymer units derived from a fluoroolefin, and b) 0.1–25 mol % of polymer units derived from a monomer having a hydrophilic site.

7. The aqueous coating composition of claim 6, wherein said fluoroolefin a) comprises 2 to 4 carbon atoms.

8. The aqueous coating composition of claim 6, wherein said monomer b) is a hydrophilic macromonomer having radical polymerizable unsaturated groups.

9. The aqueous coating composition of claim 6, wherein said copolymer comprises hydrophilic sites selected from the group consisting of: at least two oxyethylene units, at least two oxypropylene units, a combination of oxyethylene and oxypropylene units, and at least two polyester units.

10. The aqueous coating composition of claim 5, wherein said polyisocyanate component B) is mechanically dispersed in water.

11. The aqueous coating composition of claim 5, wherein said polyisocyanate component B) is a self-emulsifiable polyisocyanate.

12. The aqueous coating composition of claim 5, wherein said polyisocyanate component is selected from the group consisting of: a biuret dimer or trimer, an isocyanurate ring or urethodione ring, and a blocked polyisocyanate.

13. An aqueous coating composition comprising the reaction product of the fluorine-containing copolymer and the polyisocyanate compound of claim 1.

14. An aqueous coating composition comprising the reaction product of the fluorine-containing copolymer A) and polyisocyanate component B) of claim 5.

15. The aqueous coating composition according to claim 1, wherein the polyisocyanate compound and the fluorine-containing copolymer having hydroxyl groups are incorporated at a NCO/OH ratio (molar ratio) of from 0.1 to 2.0.

16. The aqueous coating composition according to claim 1, wherein the fluorine-coating copolymer having hydroxyl groups is a compolymer polymerized by emulsion polymerization.

17. The aqueous coating composition according to claim 4, wherein said self-emulsifiable compound is a prepolymer comprising the reaction product of a polyisocyanate with a hydrophilic polyoxyalkylene.

* * * * *